J. F. WOLANIN.
DIRECTION INDICATOR FOR MOTOR VEHICLES.
APPLICATION FILED MAY 6, 1915.
1,284,853.
Patented Nov. 12, 1918.
2 SHEETS—SHEET 1.
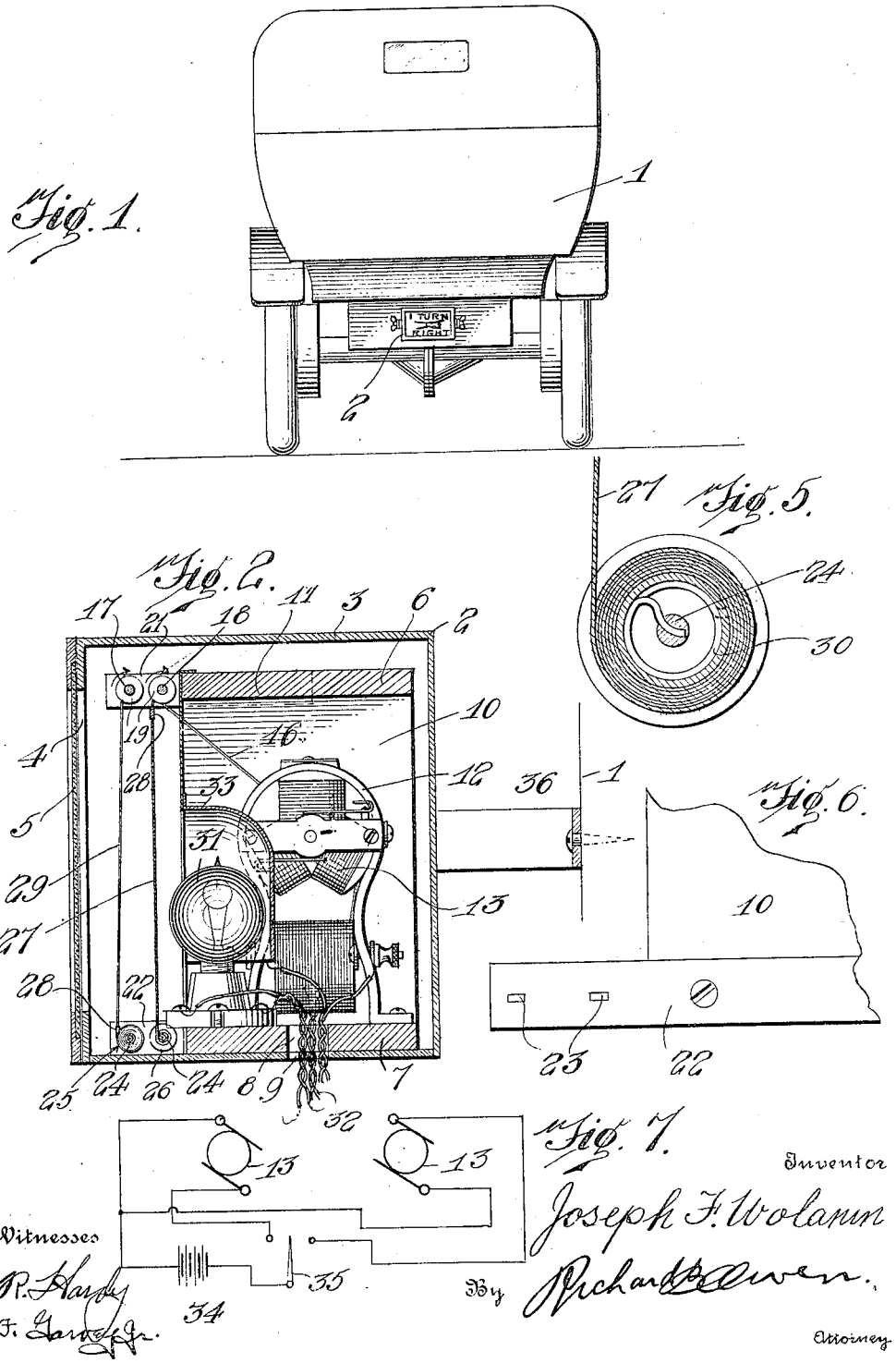

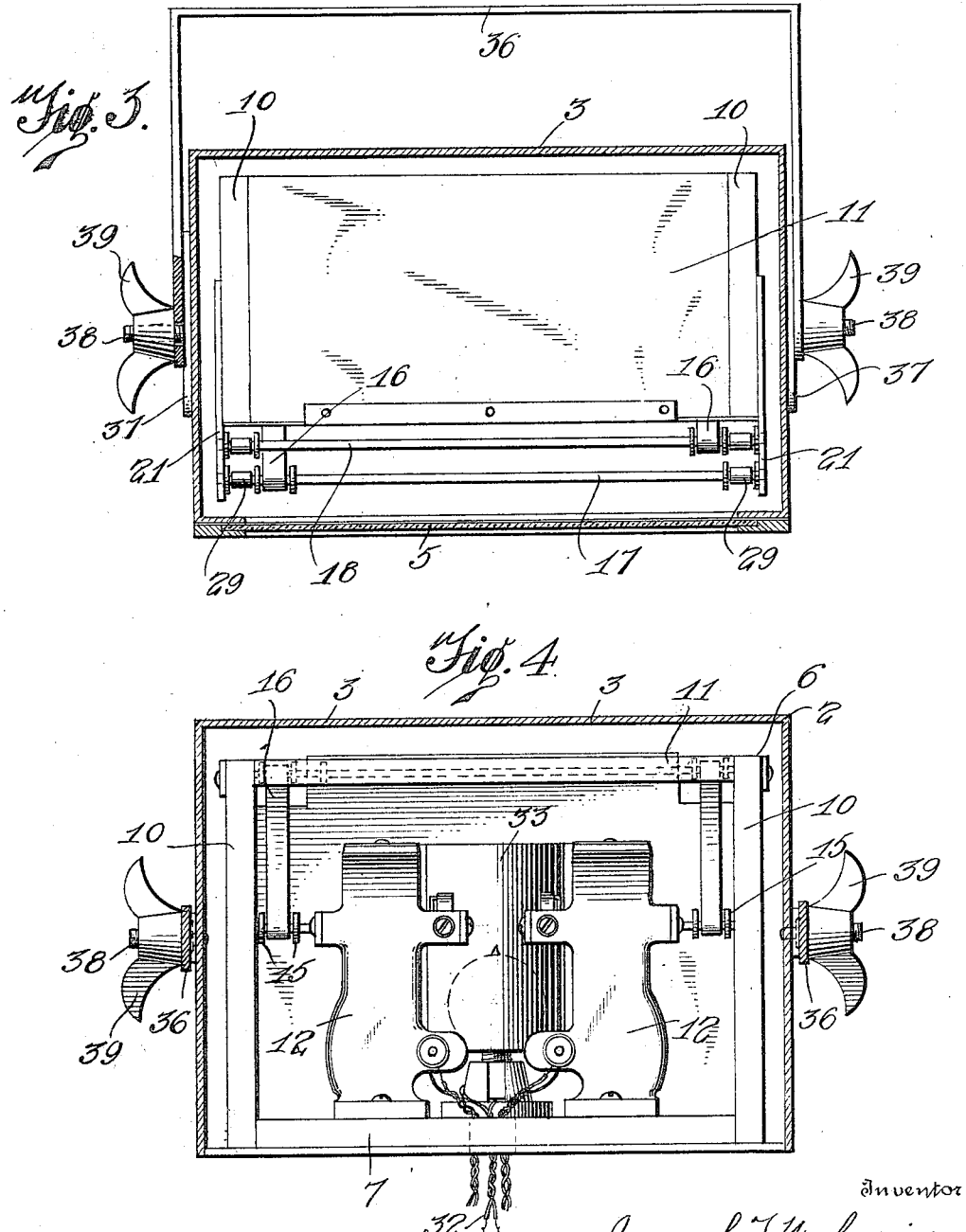

UNITED STATES PATENT OFFICE.

JOSEPH F. WOLANIN, OF DETROIT, MICHIGAN.

DIRECTION-INDICATOR FOR MOTOR-VEHICLES.

1,284,853.  Specification of Letters Patent.  Patented Nov. 12, 1918.

Application filed May 6, 1915. Serial No. 26,373.

*To all whom it may concern:*

Be it known that I, JOSEPH F. WOLANIN, a citizen of the United States, residing at Detroit, in the county of Wayne and State of Michigan, have invented certain new and useful Improvements in Direction-Indicators for Motor-Vehicles, of which the following is a specification.

This invention relates to direction indicators for motor vehicles, in order to designate the path of movement contemplated to be taken by the signaling vehicle, to give warning to those following in the rear.

An object of the invention is to associate a signaling mechanism with the rear of the car, which is controlled by the operator of the latter, and which is equally effectual for indicating the contemplated path to be taken, in day-light or by use of an artificial lighting medium.

A further object is to use the lighting means in the dual capacity of tail lights and signal illuminators, thereby reducing the cost of manufacture to a minimum.

A still further object of the invention is to provide a device of this character which is associatable with standard types of motor vehicles now in use and may be disposed at any desired angle on the rear of the vehicle.

Other objects as well as the nature, characteristic features and scope of my invention will be more readily understood from the following description taken in connection with the accompanying drawings and pointed out in the claim forming a part of this specification.

Referring to the drawings:

Figure 1 is a front elevational view of an indicator constructed in accordance with my invention, illustrating its application, Fig. 2 is a horizontal sectional view of the same, Fig. 3 is a longitudinal sectional view of the device showing to advantage one of the direction indicating aprons, likewise the bracket by which the device is connected to the motor vehicle, Fig. 4 is a sectional view looking at the other side of the device and showing to advantage the motor frame and the rear of the illuminating reflector, Fig. 5 is a sectional view of one of the automatic rollers used in the present invention and with which one of the indicating aprons is associated, Fig. 6 is a detail enlarged fragmentary view of the device showing to advantage one of the roller bearings which receive the squared ends of the axes of the rollers, and Fig. 7 is a diagrammatical view of the circuits used in this invention.

In the drawings, in order to illustrate the application of this invention, a vehicle 1 is provided, which may be of the usual or any desired form, and with which my improved indicating means generally designated 2 is associated.

My improved indicating means in the present instance comprises a casing or housing 3, preferably of a rectangular configuration and made of wood, metal or any other suitable material, the latter being preferable, however, in view of its durability. The front of the casing is provided with an opening 4, over which is mounted a transparent face 5, which is held in engagement with the front of the casing in any suitable manner. A supporting structure 6 is mounted on the interior of the casing 3, and embodies a base plate 7, which is engaged with the inner face of the floor of the casing, 3, being provided with an opening 8 therein which alines with a complemental opening 9 in the bottom of the housing. The base portion 7 of the supporting structure has its opposite ends in connection with vertical standards 10, the latter being connected by a horizontal bar 11.

Mounted on the base 7 of the supporting structure 6 are a pair of motor frames 12, which as illustrated to advantage in Figs. 2 and 4, are of an identical configuration, each having a motor 13 suitably mounted therein. A drive shaft 14 extends from each of the motors 13, being passed through suitable arms in the motor frames 12, the drive shaft 14 having flanges 15 formed thereon so as to prevent lateral displacement of the belts 16 therefrom. The opposite end of each of the belts 16 from that which is engaged with the drive shaft 14, are trained about the opposite end of driven shafts 17 and 18, as shown to advantage in Fig. 2. The shafts 17 and 18 are provided with annular flanges 19 thereon, so as to prevent lateral displacement of the belt 16 on said driven shaft. The shafts 17 and 18 are adapted to be rotated in the direction indicated by the arrows in Fig. 2, when the motors 13 are actuated, and automatically moved in a counter direction, by the exertion of pressure thereon, in the manner hereinafter set forth, so as to unwind the belt 16 from the drive shaft 14. In order to support the shafts 17 and 18, suitable standards 21 are carried by the vertical sides 10 of the supporting structure 6, as illustrated to advantage in Fig. 3.

The standards 21 above referred to are mounted upon the upper outer faces of the sides 10, while standards 22 are associated with the lower outer faces of the sides 10, as shown in Fig. 6, one of said standards 22 being provided with squared openings 23 to receive the squared ends of the axes or shafts 24 of rollers 25 and 26. The opposite ends of each of said shafts 24 are round and mounted for movement in the other of the standards 22. Each of the rollers 25 and 26 has one end of a sign indicating apron 27 secured thereto, the opposite end of each of said aprons being provided with a reinforcing strip 28, which is in connection with one end of a pair of belts 29. The belts 29 extend from the apron carried by the roller 25 and are in fixed connection with the shaft 17, whereby when movement is imparted to the latter, the apron will be actuated so as to appear immediately in the rear of the transparent face 5, so as to be discernible through the latter. The belts 29 which are in connection with the apron 27 on the shaft 26 are associated with the shaft 18, so as to be wound on the latter by the movement of said shaft. Each of the aprons 27 are automatically rewound upon the shafts 25 and 26, as soon as pressure is released from the shafts 17 and 18, by an elastic element 30, the latter in the present instance comprising a spring wire which is convoluted into the interior of each of the rollers 25 and 26, one end of each of the spring wires being in engagement with each of the rollers, while the opposite end of each of the spring wires, is connected with the shaft 24. The peculiar construction just defined is shown to advantage in Fig. 5, said figure showing to advantage sectional views of both the rollers 25 and 26, since they are identical in configuration.

An illuminating element 31 is mounted upon the base 7 and has electrical wires 32 leading therefrom which extend to a suitable source of energy, which is preferably controlled by the operator of the vehicle and may serve in the dual capacity of the usual tail-light for the vehicle, and as means for illuminating the aprons 27 when they are operated between the illuminating element 31 and the transparent face 5. It is, of course, understood that the aprons 27 are translucent and have suitable directions thereon, as shown in Fig. 1. In the present instance it is preferable to insert the directions, "I turn to the right," on one of the translucent aprons 27, while the opposite translucent apron will bear the words, "I turn to the left," or any other suitable phrase which will properly convey to the mind of the operator in a following vehicle, the direction in which the signaling vehicle is going. In order to project the light rays from the illuminating element 31 through the apron 27, a suitable reflector 33 is provided, which is preferably made of metal, and of such a configuration as to prevent the light rays from being projected upwardly or rearwardly.

The power elements or motors 13 are operated by an exciter 34, as shown in the diagrammatical view in Fig. 7, said motors being independently and singly operable, consistent with the movement of a controllable switch 35. By throwing the switch in one direction, a circuit is completed so as to operate one of the motors 13, thereby causing pressure to be exerted upon either of the shafts 17 or 18, consistent with the motor which is operated and which one is in connection with said shaft. Movement of the switch 35 in a counter direction will, of course, operate the other motor, consequently imparting movement to the other shaft. It is therefore obvious that the motors are controlled from a common manually operated switch, the latter being preferably located at a point adjacent the operator of the vehicle, so as to be instantly thrown in the desired direction for flashing the proper signal. As soon as the switch 35 is thrown into a neutral position, as shown in the diagrammatical view in Fig. 7, the roller 25 or 26 will be automatically operated in view of the elastic element 30, so as to rewind its apron thereon.

In order to associate the casing or housing 3 with the vehicle, I have provided a suitable bracket 36, which comprises a metallic strap the opposite ends of which are turned into parallelism with each other and at right angles to the body, to provide a U-shaped structure, the right angled ends of the straps or arms of the U being engaged with suitable wear plates 37 on the opposite ends of the casing 3, the latter carrying threaded stub-shafts 38, upon which the right angled ends of the bracket 36 are engaged. Said ends are held in a predetermined position on the casing by thumb-nuts 39, thereby permitting the casing to be disposed at any desired angle. Assuming therefore that the device has been mounted on a motor vehicle, as illustrated in Fig. 1, and it is desired to operate one of the aprons 27, so as to dispose the same to the rear of the transparent face 5, through which it is discernible, pressure is exerted on the switch 35, so as to throw the latter into engagement with the contact for closing the circuit to operate the desired motor. This operation will energize the motor so as to actuate the drive shaft 14, thereby winding the belt 16 thereon to exert pressure on either of the shafts 17 or 18, consequently imparting movement to the desired apron 27. It is, of course, understood that in using the device at night, it will not be necessary to simultaneously light the illuminating element 31, as this will be normally lighted at night, since it is almost a universal regulation to place an illuminating agent at the rear of moving vehicles. After the desired signal has been flashed, the switch 35 is thrown into a neutral position, and the roller upon which the apron 27 is mounted, and which has been actuated in the manner just set forth, will be automatically operated by the elastic element 30 to cause the rewind of the apron 27 on its respective roller.

It will be understood that the above description and accompanying drawings comprehend only the general and preferred embodiment of my invention and that various minor changes in details of construction, proportion and arrangement of parts may be made within the scope of the appended claim without sacrificing any of the advantages of my invention.

Having thus fully described my invention what I claim as new and desire to secure by Letters Patent is:

A vehicle signal, comprising a casing having a transparent front, spring rollers at one end of the transparent front, shafts at opposite ends of the transparent front, a flexible signal element wound on each spring roller, flexible elements connecting the signal elements with the respective shafts, an electric motor for each signal element, a flexible operating element wound on each of the said shafts and connected with the shaft of a motor to wind thereon, an electric lamp in the casing in the rear of the signal elements, and electric circuits including the lamp and motors and under control of the driver.

In testimony whereof I affix my signature in presence of two witnesses.

JOSEPH F. WOLANIN.

Witnesses:
JOSEPH B. SOSNOWSKI,
WOJAISCH WINNISKI.